(12) United States Patent
Chang et al.

(10) Patent No.: US 7,916,143 B2
(45) Date of Patent: Mar. 29, 2011

(54) SYSTEM AND METHOD FOR PRODUCING LOCOMOTION ANIMATION

(75) Inventors: Sung June Chang, Daejeon (KR); Se Hoon Park, Seoul (KR); In Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 872 days.

(21) Appl. No.: 11/781,106

(22) Filed: Jul. 20, 2007

(65) Prior Publication Data

US 2008/0136824 A1 Jun. 12, 2008

(30) Foreign Application Priority Data

Dec. 7, 2006 (KR) .................. 10-2006-0124011
Mar. 19, 2007 (KR) .................. 10-2007-0026760

(51) Int. Cl.
*G06T 15/70* (2006.01)
(52) U.S. Cl. ........ 345/474; 345/419; 345/473; 345/475; 345/952; 345/953; 345/957; 434/247; 382/103; 382/106; 382/107; 382/154; 348/169; 700/245
(58) Field of Classification Search ........... 345/419, 345/473, 474, 475, 660, 952, 953, 957; 382/103, 382/106, 107, 154; 348/169
See application file for complete search history.

(56) References Cited

U.S. PATENT DOCUMENTS

| 5,731,821 | A | * | 3/1998 | Girard | 345/474 |
| 6,144,385 | A | * | 11/2000 | Girard | 345/424 |
| 7,151,542 | B2 | * | 12/2006 | Isner | 345/474 |
| 7,403,202 | B1 | * | 7/2008 | Nash | 345/474 |

FOREIGN PATENT DOCUMENTS

KR 1020020035386 A 5/2002
KR 1020020095774 A 12/2002

OTHER PUBLICATIONS

Le et al. "Integrating Age Attributes to Virtual Human Locomotion". Published 2003.*
Choi et al. "Planning Biped Locomotion Using Motion Capture Dta and Probabilistic Roadmaps". ACM 2003.*

* cited by examiner

*Primary Examiner* — Kimbinh T Nguyen

(57) ABSTRACT

Provided are a system and a method that automatically produce natural locomotion animation without an applicable discontinuity portion with respect to various moving distance and timing by using motion capture data. The system includes a motion capture data storage, a simulation calculator, and an animation calculator. The method includes defining a speed calculated in the moving motion capture data as a maximum moving speed of a simulation in order to calculate an entire moving distance, a stopped time when starting and arriving, and a stopped time before starting and after arriving regarding to respective characters; extracting a portion of the arriving motion capture data to be appropriate for the entire moving distance in order to produce the locomotion animation when the entire moving distance is less than a moving distance of the arriving motion capture data; and satisfying an entire time corresponding to an entire motion of animation.

13 Claims, 3 Drawing Sheets

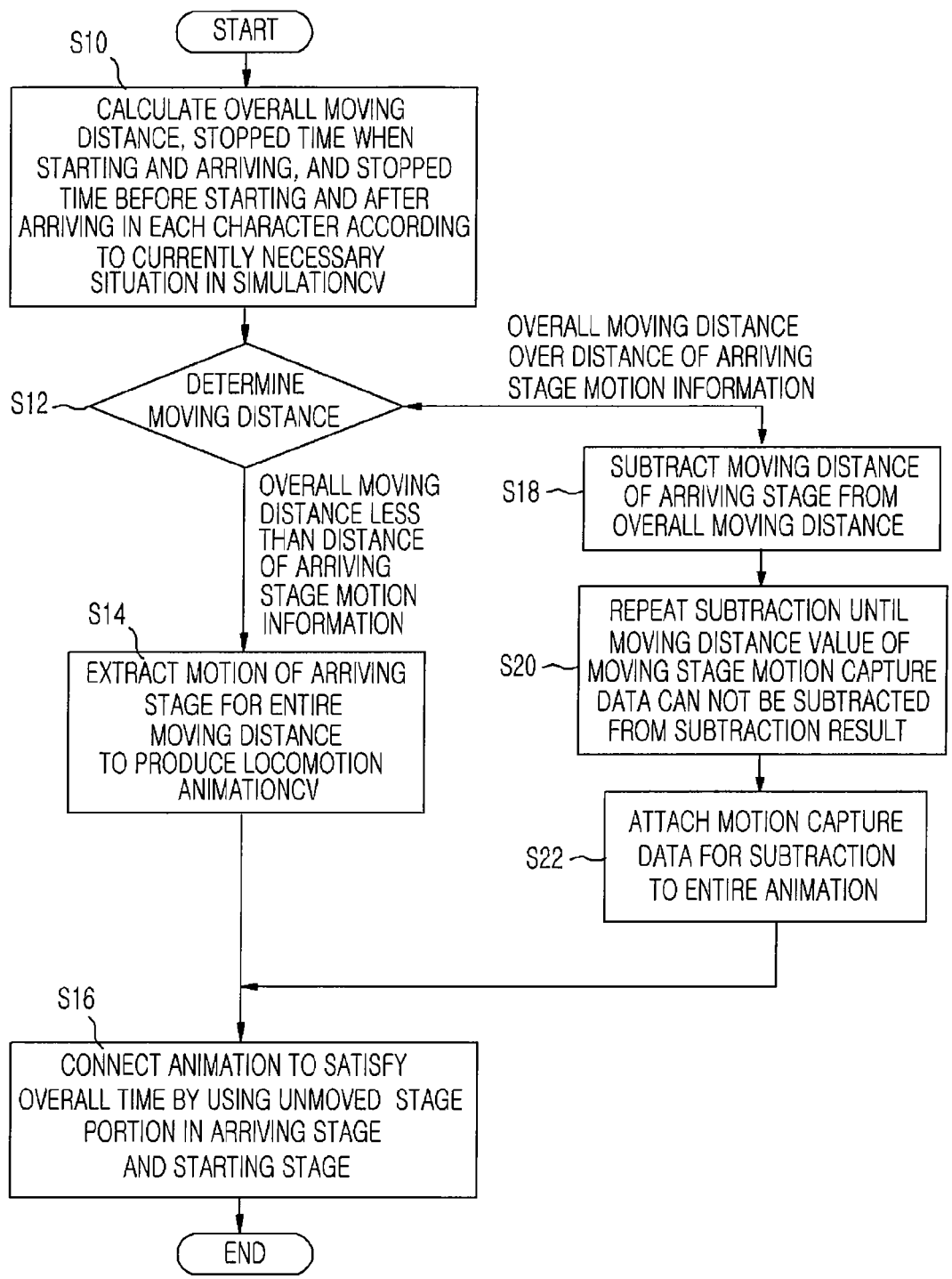

SYSTEM AND METHOD FOR PRODUCING LOCOMOTION ANIMATION

BACKGROUND OF THE INVENTION

1. Field of the Invention

The present invention relates to a system and a method for producing locomotion animation, and more particularly, to a system and a method that automatically produce natural locomotion animation without an applicable discontinuity portion with respect to various moving distance and timing by using motion capture data.

2. Description of the Related Art

A conventional method of producing a high-quality animation includes a method of utilizing original motion capture data as it is and a method of combining or modifying motion capture data to produce a high-quality animation.

First, the method of utilizing original motion capture data put a sensor on an actual person and extracts motion capture data by using the sensor to produce animation.

This method utilizes the motion capture data of an actual person as it is such that a high quality animation is very natural. However, since the motion capture data must be used as it is in animation, it can be very hard to be applied to locomotion animation necessary for various moving distance and timing.

Second, to resolve the above problem by combining or modifying the motion capture data according to a blending method, a blending method combines respectively different two motion data to create intermediate motion data. However, in the case of locomotion animation, unnatural motion data are produced due to the limit such as no slip between foot and ground in the locomotion animation.

Moreover, a designer may correct problematic motion capture data, respectively, but this costs a lot of money and cannot be applied to a large-scale animation such as crowd.

SUMMARY OF THE INVENTION

Accordingly, the present invention is directed to a system and a method for producing locomotion animation, which substantially obviates one or more problems due to limitations and disadvantages of the related art.

It is an object of the present invention to provide a system and a method that automatically produce natural locomotion animation without an applicable discontinuity portion with respect to various moving distance and timing by using motion capture data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a locomotion animation producing system using motion capture data, the system including: a motion capture data storage storing starting motion capture data in a starting stage, moving motion capture data in a moving stage, and arriving motion capture data in an arriving stage; a simulation calculator defining a speed calculated in the moving motion capture data as a maximum moving speed of a simulation in order to calculate an entire moving distance, a stopped time when starting and arriving, and a stopped time before starting and after arriving regarding to respective characters; and an animation calculator extracting a portion of the arriving motion capture data to be appropriate for the entire moving distance in order to produce the locomotion animation and to satisfy an entire time corresponding to an entire motion of animation when the entire moving distance is less than a moving distance of the arriving motion capture data.

The system further may include a motion capture data receiver dividing the motion capture data into the starting motion capture data in the starting stage, the moving motion capture data in the moving stage, and the arriving motion capture data in the arriving stage in order to store them in the motion capture data storage.

The calculating of the entire moving distance, the stopped time when starting and arriving, and the stopped time before starting and after arriving may be performed regarding to respective characters according to a currently necessary situation in the simulation.

The animation calculator may subtract the moving distance of the arriving stage from the entire moving distance when the entire moving distance is more than the moving distance of the arriving stage motion capture and may repeat the subtraction until a moving distance value of the moving motion capture data can not be subtracted from the subtraction result according to the subtraction result in order to attach a portion of the motion capture data used for the subtraction to an entire animation and to satisfy an entire time corresponding to the entire motion of the animation. The number of connecting the portion of the motion capture data used for the subtraction to the entire animation may be the same as the number of the repeating the subtraction.

A value and a ratio of the stopped time before the starting and after the arriving may be utilized and stop portion motion capture data in the starting stage and stop portion motion capture data in the arriving stage may be attached to a front and a rear of the animation, respectively, in order to satisfy the entire time corresponding to the entire motion of the animation.

The system further may include an animation storage storing the animation satisfying the entire time by using the animation calculator, the entire time corresponding to the entire motion of the animation.

The motion capture data receiver may receive the motion capture data from the motion capture system.

In another aspect of the present invention, there is provided a method of producing a locomotion animation by using a motion capture data that is divided into a starting stage, moving motion capture data in a moving stage, and arriving motion capture data in an arriving stage, the method may include: defining a speed calculated in the moving motion capture data as a maximum moving speed of a simulation in order to calculate an entire moving distance, a stopped time when starting and arriving, and a stopped time before starting and after arriving regarding to respective characters; extracting a portion of the arriving motion capture data to be appropriate for the entire moving distance in order to produce the locomotion animation when the entire moving distance is less than a moving distance of the arriving motion capture data; and satisfying an entire time corresponding to an entire motion of animation.

The defining of the speed may calculate the entire moving distance, the stopped time when starting and arriving, and the stopped time before starting and after arriving regarding to respective characters in the simulation according to a currently necessary situation in the simulation.

The satisfying of the entire time may utilize a value and a ratio of the stopped time before the starting and after the arriving and attaching stop portion motion capture data in the starting stage and stop portion motion capture data in the arriving stage to a front and a rear of the animation, respectively, in order to satisfy the entire time corresponding to the entire motion of the animation.

The method further may include: subtracting the moving distance of the arriving motion capture data from the entire moving distance when the entire distance is more than the moving distance of the arriving motion capture data during the extracting of the portion of the arriving motion capture data; repeating the subtraction until a moving distance value of the moving motion capture data can not be subtracted from the subtraction result; and attaching a portion of the motion capture data used for the subtraction to the entire animation and satisfying the entire time corresponding to the entire motion of the animation. The number of connecting the portion of the motion capture data used for the subtraction to the entire animation may be the same as the number of the repeating the subtraction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings:

FIG. 3 illustrates a flowchart of a locomotion animation manufacturing method according to an embodiment of the present invention.

DETAILED DESCRIPTION OF THE INVENTION

Reference will now be made in detail to the preferred embodiments of the present invention, examples of which are illustrated in the accompanying drawings.

Figure 1:
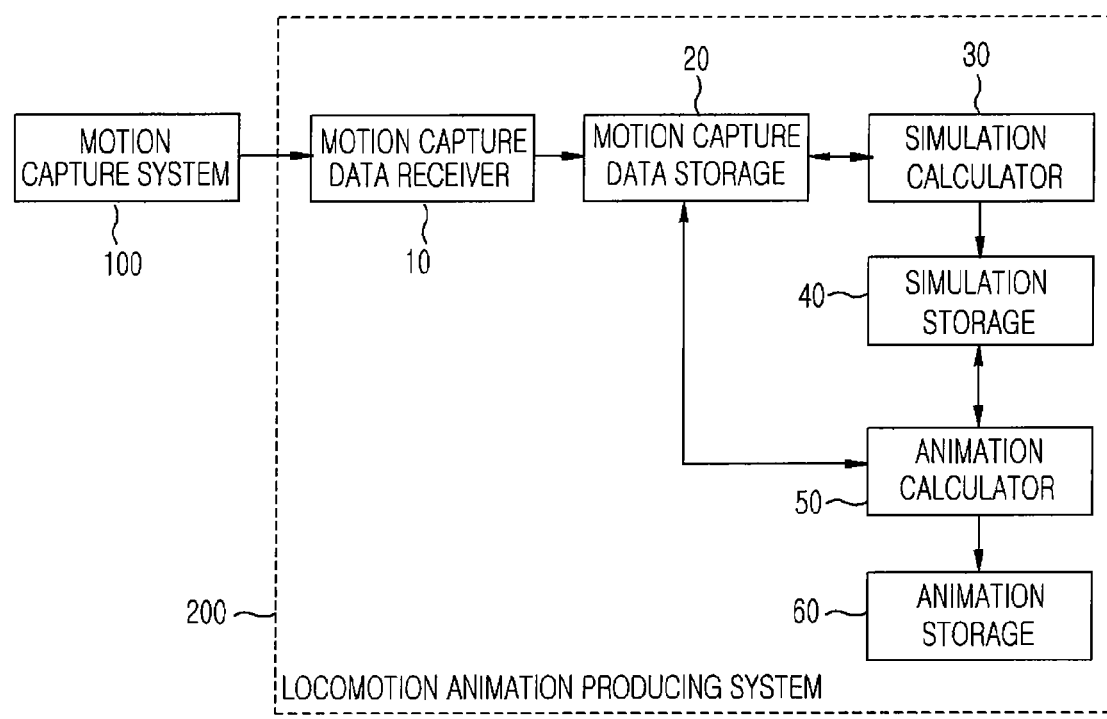
FIG. 1 illustrates a block diagram of a locomotion animation manufacturing system according to an embodiment of the present invention.
Figure 2:
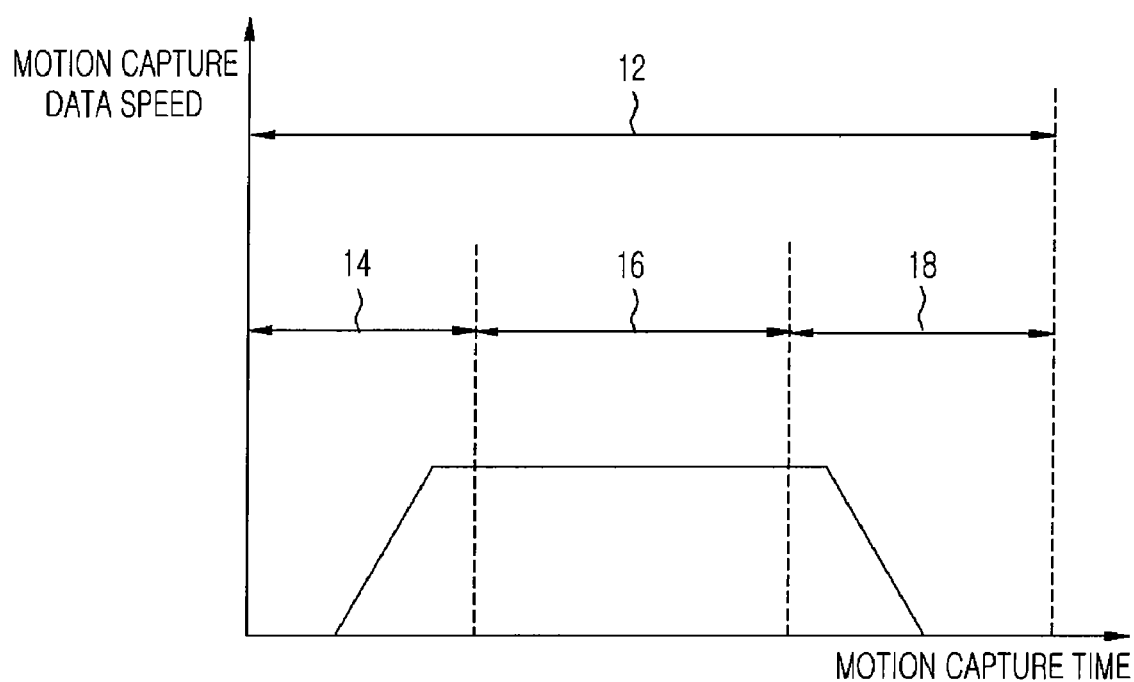
FIG. 2 illustrates a graph of dividing entire motion capture data into starting motion capture data of a starting stage, moving capture data of a moving stage, and an arriving motion capture of an arriving state.

FIG. 1 illustrates a block diagram of a locomotion animation manufacturing system according to an embodiment of the present invention and the locomotion animation manufacturing system 200 produces locomotion animation by using motion capture data provided from a motion capture system 100. The locomotion animation manufacturing system 200 includes a motion capture data receiver 10, a motion capture data storage 20, a simulation calculator 30, a simulation storage 40, an animation calculator 50, and an animation storage 60.

Referring to FIG. 1, the motion capture data receiver 10 in the locomotion animation manufacturing system 200 divides entire motion capture data 12 supplied from the motion capture system 100 into starting motion capture data 14 in a starting stage, moving capture data 16 in a moving stage, and an arriving motion capture 18 in an arriving state, and then stores them in the motion capture data storage 20. The starting motion capture data 14 of the starting stage are motion capture data when a corresponding character sufficiently stops and starts movement until being stabilized. The moving motion capture data 16 of the moving stage are motion capture data during a period of when the corresponding character is stabilized. The motion capture data are generally stored by using cycles to express various moving distance. Here, if necessary, a little change can be applied. This includes a first method makes cycles when diversely expressing stopped times at the starting stage and the arriving stage and a second method makes the beginning of the starting point and the end of the arriving point as cycles by connecting the beginning and the end when repeating various stills and movements.

The simulation calculator 30 accesses the motion capture data storage 20, defines the maximum moving speed of the simulation as a speed calculated from the moving motion capture data, calculates overall moving distance, stopped time when starting and arriving, and stopped time before starting and after arriving, respectively, in each character according to a currently necessary situation in simulation, and stores them in the simulation storage 40 in operation S10 of FIG. 3.

The animation calculator 50 accesses the simulation storage 40 and the motion capture data storage 20 and compares overall moving distance in the simulation storage 40 with moving distance of the arriving stage motion capture data in operation S12 of FIG. 3.

In operation S14 of FIG. 3, the animation calculator 50 extracts a portion of motions in the arriving stage for the entire moving distance and constitutes locomotion animation when the overall moving distance is less than the moving distance of the arriving stage motion capture data according to the comparison result.

In operation S18 of FIG. 3, the animation calculator 50 subtracts the moving distance of a arriving stage from the entire moving distance when the overall moving distance is more than the moving distance of the arriving stage motion capture data according to the comparison result.

In operation S20 of FIG. 3, the animation calculator 50 repeats subtraction until the moving distance value of the moving stage motion capture data can not be subtracted from the subtraction result.

In operation S22 of FIG. 3, the animation calculator 50 attaches the motion capture data of a portion used for subtraction to the overall animation, and then performs operation S16.

The animation calculator 50 utilizes a value and a ratio of a stopped time before starting and after arriving in the simulation storage 40 and attaches the stopped portion motion capture data of the starting stage and the stopped portion motion capture data of the arriving stage to the front and end of the animation stored in the animation storage 60, thereby satisfying an overall time corresponding to an overall motion of the animation. Consequently, animation with the synchronized time and moving distance is produced, and then is stored in the animation storage 60 in operation S16 of FIG. 3.

Since the locomotion animation is produced by using the received motion capture data, it is naturally connected without a discontinuity portion. This can be also applied to an arbitrary moving distance and time, and thus its expandability is excellent.

The present invention explains one dimensional locomotion animation with starting and arriving, but this can be applied to a multi-dimensional locomotion animation that occasionally performs arriving after starting easily when arriving after starting constitutes one cycle.

Additionally, when the stopped motion capture data before starting and stopped motion capture data after arriving makes cycles, the location animation that can be easily applicable to the very long stopped time can be produced.

The present invention divides the motion capture data 12 into starting motion capture data 14 in a starting stage, moving capture data 16 in a moving stage, and an arriving motion capture 18 in an arriving state, and then stores them in the motion capture data storage 20. By using this, a natural locomotion animation can be produced without a discontinuity portion and animation satisfying various moving distance and requirement of time can be automatically produced. Therefore, by using this, unnatural motion data produced due to the limit such as no slip between foot and ground can be improved in actual various animation works and thus realistic locomotion animation can be easily produced.

As described above, the method of the present invention can be programmed and can be stored in computer readable recoding medium (e.g., CD ROM, RAM, ROM, Floppy Disk, Hard Disk, Optical Disk, etc.).

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A locomotion animation producing system using motion capture data, comprising:
    a motion capture data storage configured to store starting motion capture data in a starting stage, moving motion capture data in a moving stage, and arriving motion capture data in an arriving stage secured by dividing the motion capture data;
    a simulation calculator configure to determine a speed calculated from the moving motion capture data as a maximum moving speed for a simulation and calculate an entire moving distance required for the simulation, a stopped time when starting and arriving, and a stopped time before starting and after arriving for each characters; and
    an animation calculator configured to extract a portion of the arriving motion capture data according to the entire moving distance if the entire moving distance is less than a moving distance of the arriving motion capture data and produce a locomotion animation using the extracted portion of the arriving motion capture data to satisfy an entire time corresponding to an entire motion of animation,
    wherein the starting motion capture data include a first portion of the motion capture data corresponding to a period between that a corresponding character sufficiently stops and starts to move and that the movement is stabilized,
    wherein the moving motion capture data include a second portion of the motion capture data corresponding to a period that the movement of the corresponding character is stabilized, and
    wherein the arriving motion capture data include a third portion of the motion capture data during a period between that the corresponding character reduces its moving speed and that the corresponding character sufficiently stops.

2. The system of claim 1, further comprising a motion capture data receiver configured to divide the motion capture data into the starting motion capture data in the starting stage, the moving motion capture data in the moving stage, and the arriving motion capture data in the arriving stage.

3. The system of claim 1, wherein the calculating of the entire moving distance, the stopped time when starting and arriving, and the stopped time before starting and after arriving is performed regarding to each characters according to a currently necessary situation in the simulation.

4. The system of claim 1, wherein the animation calculator subtracts the moving distance of the arriving motion capture data from the entire moving distance when the entire moving distance is greater than the moving distance of the arriving motion capture data and repeats the subtraction until a moving distance value of the moving motion capture data can-not be subtracted from the subtraction result, and attach a portion of the motion capture data that is used for the subtraction to an entire animation to satisfy the entire time corresponding to the entire motion of the animation.

5. The system of claim 4, wherein the number of attaching the portion of the motion capture data used for the subtraction to the entire animation is the same as the number of repeating the subtraction.

6. The system of claim 1, wherein a ratio between a time value of the entire moving distance and the stopped time before the starting and a ratio between the time value of the entire moving distance and the stopped time after the arriving are utilized, and stop portion motion capture data in the starting stage and stop portion motion capture data in the arriving stage are attached to a front and a rear of the animation, respectively, to satisfy the entire time corresponding to the entire motion of the animation.

7. The system of claim 1, further comprising an animation storage configured to store the animation satisfying the entire time obtained by using the animation calculator, the entire time corresponding to the entire motion of the animation.

8. The system of claim 2, wherein the motion capture data receiver receives the motion capture data from a motion capture system.

9. A computer-implemented method for producing a locomotion animation by using motion capture data that are divided into starting motion capture data in a starting stage, moving motion capture data in a moving stage, and arriving motion capture data in an arriving stage, the computer-implemented method comprising:
    determining, at a simulation calculator, a speed calculated from the moving motion capture data as a maximum moving speed for a simulation and calculating an entire moving distance required for the simulation, a stopped time when starting and arriving, and a stopped time before starting and after arriving for each character; and
    extracting, at an animation calculator, a portion of the arriving motion capture data according to the entire moving distance if the entire moving distance is less than a moving distance of the arriving motion capture data and producing a locomotion animation using the extracted portion of the arriving motion capture data to satisfy an entire time corresponding to an entire motion of animation,
    wherein the starting motion capture data include a first portion of the motion capture data corresponding to a period between that a corresponding character sufficiently stops and starts to move and that the movement is stabilized,
    wherein the moving motion capture data include a second portion of the motion capture data corresponding to a period that the movement of the corresponding character is stabilized, and
    wherein the arriving motion capture data include a third portion of the motion capture data during a period between that the corresponding character reduces its moving speed and that the corresponding character sufficiently stops.

10. The method of claim 9, wherein the entire moving distance, the stopped time when starting and arriving, and the stopped time before starting and after arriving regarding to respective characters are calculated according to a currently necessary situation in the simulation.

11. The method of claim 9, wherein a ratio between a time value of the entire moving distance and the stopped time before the starting and a ratio between the time value of the entire moving distance and the stopped time after the arriving are utilized, and stop portion motion capture data in the starting stage and stop portion motion capture data in the arriving stage are attached to a front and a rear of the animation, respectively, to satisfy the entire time corresponding to the entire motion of the animation.

12. The method of claim 9, further comprising:
subtracting the moving distance of the arriving motion capture data from the entire moving distance if the entire distance is greater than the moving distance of the arriving motion capture data during the extracting of the portion of the arriving motion capture data;
repeating the subtracting step until a moving distance value of the moving motion capture data can-not be subtracted from the subtraction result; and
attaching a portion of the motion capture data that is used for the subtraction to the entire animation to satisfy the entire time corresponding to the entire motion of the animation, wherein the subtracting, repeating, and attaching steps are performed at the animation calculator.

13. The method of claim 12, wherein the number of attaching the portion of the motion capture data used for the subtraction to the entire animation is the same as the number of repeating the subtraction.

* * * * *